(12) United States Patent
Hua et al.

(10) Patent No.: US 12,081,854 B2
(45) Date of Patent: Sep. 3, 2024

(54) RECEIVER FOR LIGHT TRANSMISSION SYSTEM, LIGHT TRANSMISSION SYSTEM AND METHOD OF OPERATING A LIGHT TRANSMISSION SYSTEM

(71) Applicant: SEW-EURODRIVE GMBH & CO. KG, Bruchsal (DE)

(72) Inventors: Zhidong Hua, Bruchsal (DE); Patrick Rech, Modautal (DE); Thomas Schäfer, Karlsdorf-Neuthard (DE); Josef Schmidt, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 163 days.

(21) Appl. No.: 17/770,798

(22) PCT Filed: Oct. 1, 2020

(86) PCT No.: PCT/EP2020/025444
§ 371 (c)(1),
(2) Date: Apr. 21, 2022

(87) PCT Pub. No.: WO2021/078402
PCT Pub. Date: Apr. 29, 2021

(65) Prior Publication Data
US 2022/0377215 A1 Nov. 24, 2022

(30) Foreign Application Priority Data
Oct. 21, 2019 (DE) .......................... 102019007311.8

(51) Int. Cl.
*H04N 23/55* (2023.01)
*G02B 30/27* (2020.01)
*H04B 10/116* (2013.01)

(52) U.S. Cl.
CPC ............ *H04N 23/55* (2023.01); *G02B 30/27* (2020.01); *H04B 10/116* (2013.01)

(58) Field of Classification Search
CPC ....... H04N 23/55; G02B 30/27; H04B 10/116
(Continued)

(56) References Cited

U.S. PATENT DOCUMENTS 4,437,764 A * 3/1984 Levine .................. H04N 23/84
348/242
4,546,380 A * 10/1985 Knop ..................... H04N 23/55
348/340
(Continued)

FOREIGN PATENT DOCUMENTS

DE 102018006988 B3 8/2019
EP 2940902 A1 11/2015
(Continued)

OTHER PUBLICATIONS

International Search Report issued in corresponding International Application No. PCT/EP2020/025444 dated Jan. 15, 2021, pp. 1-2, English Translation.
(Continued)

*Primary Examiner* — Albert H Cutler
(74) *Attorney, Agent, or Firm* — Carter, DeLuca & Farrell LLP

(57) ABSTRACT

A receiver for a light transmission system includes a camera having an image sensor, and a light-sensitive area of the image sensor includes a plurality of rows of light-sensitive elements. The image sensor is configured such that the light-sensitive area of the image sensor is scanned row by row or column by column. An attachment element is arranged such that light incident on the light-sensitive area of the image sensor passes through the attachment element
(Continued)

beforehand. The attachment element has at least one lenticular region and at least one planar region.

17 Claims, 5 Drawing Sheets

(58) Field of Classification Search
USPC .......................................... 348/207.99–375
See application file for complete search history.

(56) References Cited

U.S. PATENT DOCUMENTS

| 10,382,130 | B1* | 8/2019 | Inskeep ................ H04N 23/55 |
| 2002/0140835 | A1* | 10/2002 | Silverstein ............ G02B 30/27 |
| | | | 348/E13.008 |
| 2004/0207104 | A1 | 10/2004 | Ono et al. |
| 2012/0133815 | A1 | 5/2012 | Nakanishi et al. |
| 2014/0071317 | A1* | 3/2014 | Yamagata ............ H04N 23/741 |
| | | | 348/340 |
| 2015/0077585 | A1* | 3/2015 | Kobayashi ........... G02B 3/0037 |
| | | | 348/222.1 |
| 2015/0195042 | A1 | 7/2015 | Raskar et al. |
| 2015/0365167 | A1 | 12/2015 | Uliyar et al. |
| 2017/0214863 | A1* | 7/2017 | Narabu ................ H01L 27/1464 |
| 2018/0106600 | A1* | 4/2018 | Greenspan ........... G01B 11/002 |
| 2021/0344420 | A1 | 11/2021 | Hua et al. |

FOREIGN PATENT DOCUMENTS

| FR | 3020533 | A1 | 10/2015 |
| FR | 3061604 | A1 | 7/2018 |

OTHER PUBLICATIONS

International Report on Patentability issued in corresponding International Application No. PCT/EP2020/025444 dated Apr. 26, 2022, pp. 1-7, English Translation.

* cited by examiner

RECEIVER FOR LIGHT TRANSMISSION SYSTEM, LIGHT TRANSMISSION SYSTEM AND METHOD OF OPERATING A LIGHT TRANSMISSION SYSTEM

FIELD OF THE INVENTION

The present invention relates to a receiver for a light transmission system, which, according to example embodiments, includes a camera having an image sensor, in which a light-sensitive area of the image sensor includes a plurality of rows of light-sensitive elements and the image sensor is configured such that the light-sensitive area of the image sensor is scanned row by row or column by column, and further includes an attachment element arranged such that light incident on the light-sensitive area of the image sensor passes through the attachment element beforehand. The present invention also relates to a light transmission system, which, according to example embodiments, includes a receiver as described herein and a transmitter. The present invention further relates to a method of operating a light transmission system.

BACKGROUND INFORMATION

A system and a method of data transmission using visible light are described in "Using a CMOS Camera Sensor for Visible Light Communication," Danakis et. al, 978-1-4673-4941-3, IEEE. This article describes a camera of a smartphone serving as a visible light receiver. The camera includes a CMOS image sensor whose light-sensitive area is scanned row by row. The transmitter is a light source in the form of an LED that emits modulated light. By taking advantage of the rolling shutter effect of the CMOS image sensor, a data transmission rate is achieved that is greater than a frame rate of the camera.

A system and method of data transmission using visible light is described in German Patent Document No. 10 2018 006 988. The system includes a receiver with an image sensor whose light-sensitive area is scanned row by row, and a transmitter with a controllable illuminant which emits modulated light. The receiver has a lenticular sheet or cylindrical lens array, which is arranged between a lens of the receiver and the transmitter. An image projected onto the light-sensitive area of the image sensor is thereby blurred. By taking advantage of the rolling shutter effect of the image sensor, an increased data transmission rate is achieved.

A visible light communication system including a light source and a receiver are described in French Patent Document No 3 020 533. A photovoltaic system for power generation and optical communication is described in French Patent Document No. 3 061 604. A system and method of optical communication is described in U.S. Patent Application Publication No. 2015/0365167. A system and method of data transmission using light is described in U.S. Patent Application Publication No. 2015/0195042. A display device for performing communication using visible light is described in U.S. Patent Application Publication No. 2012/0133815.

SUMMARY

Example embodiments of the present invention provide a receiver for a light transmission system, a corresponding system, and a method of operating the system. An aspect hereof is to achieve a data transmission rate which is greater than a frame rate of a camera of the receiver. An aspect hereof is also to project a sharp optical image onto an image sensor of the camera.

According to an example embodiment of the present invention, a receiver for a light transmission system includes a camera with an image sensor. The light-sensitive area of the image sensor includes a plurality of rows of light-sensitive elements. The image sensor is configured to scan the light-sensitive area of the image sensor on a row-by-row or column-by-column basis. The receiver also includes an attachment element. The attachment element is arranged such that light incident on the light-sensitive area of the image sensor passes through the attachment element first.

According to example embodiments, the attachment element of the receiver includes at least one lenticular region and at least one planar region. Light passing through the at least one lenticular region of the attachment element generates a first image on the light-sensitive area of the image sensor. Light passing through the at least one planar region of the attachment element generates a second image on the light-sensitive area of the image sensor.

Light passing through the at least one lenticular region of the attachment element is relatively strongly refracted. Therefore, the first image generated on the image sensor of the camera is a blurred image. For example, a light beam originating from a point light source is imaged in the form of a luminous stripe. When modulated light incides, the luminous stripe is light and dark in time sequence, depending on the modulation. By scanning the light-sensitive area of the image sensor row by row or column by column, the luminous stripe can thus have light and dark areas, depending on the modulation. From the bright and dark areas of the luminous stripe, a data stream can be detected according to which the light source emits modulated light.

Light passing through the at least one planar region of the attachment element passes through the attachment element at least approximately in a straight line. The second image generated on the image sensor of the camera is therefore a sharp optical image.

By the configuration of the receiver, a data stream can thus be detected from the first image at a data transmission rate that is greater than a frame rate of the camera of the receiver. A sharp optical image can be detected from the second image. For example, the receiver is thus suitable for fast data transmission and also for simultaneous capturing of sharp optical images.

According to example embodiments, the attachment element is shaped in the form of a foil or a plate. The at least one lenticular region has an alternating material thickness, and the at least one planar region has a constant material thickness. The film is translucent. Due to the alternating material thickness, the refraction of an incident light beam is not the same everywhere, but depends on the location of impact.

According to example embodiments, the material thickness of the at least one lenticular region is constant in a preferred direction and alternating in a transverse direction, which is perpendicular to the preferred direction. This arrangement of the lenticular region causes an incident light beam to be imaged in the form of a luminous stripe extending in the transverse direction.

According to example embodiments, the attachment element has a plurality of stripe-shaped lenticular regions and a plurality of stripe-shaped planar regions. The stripe-shaped lenticular regions extend, for example, parallel to the stripe-shaped planar regions.

For example, the stripe-shaped lenticular regions are oriented parallel to the transverse direction. For example, the stripe-shaped planar regions are also oriented parallel to the transverse direction.

According to example embodiments, the receiver further includes an accommodating unit. The accommodating unit includes a first accommodating element and a second accommodating element, which is movable relative to the first accommodating element. The camera is accommodated in the first accommodating element and the attachment element is accommodated in the second accommodating element. Accordingly, the attachment element is movable—for example pivotable or displaceable—relative to the camera.

According to example embodiments, the at least one lenticular region includes a plurality of bumps, which are arranged side by side in the transverse direction.

For example, the bumps of the at least one lenticular region have a semicircular shape.

A light transmission system according to an example embodiment of the present invention includes a receiver as described herein and a transmitter, which has at least one controllable light source. The at least one light source of the transmitter emits modulated light according to a predetermined data stream.

According to example embodiments, the attachment element of the receiver is arranged between the at least one controllable light source of the transmitter and the camera of the receiver. Accordingly, it is provided that light incident on the light-sensitive area of the image sensor of the camera passes through the attachment element beforehand.

In a method of operating a light transmission system according to an example embodiment of the present invention, the light-sensitive area of the image sensor is scanned row by row or column by column. For example, a first image being projected through the at least one lenticular region of the attachment element onto the light-sensitive area is processed separately from a second image being projected through the at least one planar region of the attachment element onto the light-sensitive area.

According to example embodiments, the data stream is detected from the first image, according to which the at least one controllable light source of the transmitter emits modulated light. For example, the data transmission rate of the data stream is greater than an image frequency of the camera of the receiver.

According to example embodiments, an optical image is detected from the second image. For example, the second image is a sharp optical image.

Thus, by the method described herein, different information can be transmitted simultaneously by the first image and the second image from the transmitter to the receiver and can be received by the receiver. For example, coordinates may be encoded in the data stream. Positioning is made possible by evaluating the data stream detected from the first image. Scanning of, for example, a QR code, is made possible by evaluating the second image.

Further features and aspects of example embodiments of the present invention are explained in more detail below with reference to the appended schematic Figures.

DETAILED DESCRIPTION

Figure 1:
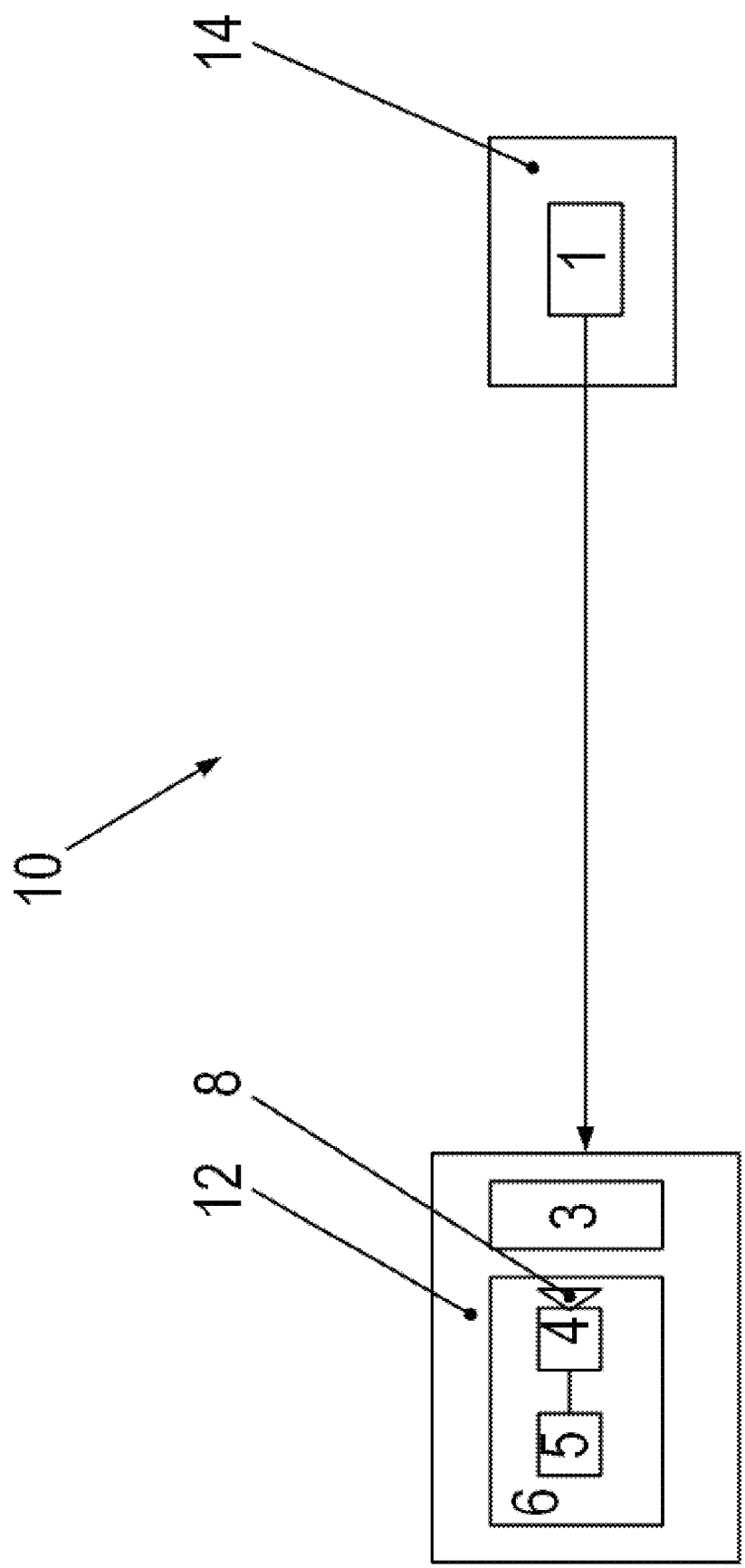
FIG. 1 schematically illustrates a light transmission system.

FIG. 1 schematically illustrates a light transmission system 10. The light transmission system 10 includes a transmitter 14, which includes a controllable light source 1. The light source 1 is, for example, an LED, a ceiling lamp, or a headlight of a vehicle. The light transmission system 10 further includes a receiver 12.

The receiver 12 includes a camera 6. The camera 6 includes an image sensor 4. The image sensor 4 has a light-sensitive area comprising a plurality of rows and columns of light sensitive elements. In operation of the camera 6, the light-sensitive area of the image sensor 4 is scanned row by row or column by column. The individual scanned rows are combined to form an overall image. The camera 6 further includes an optical element in the form of an optical lens 8, the lens 8 being arranged in front of the image sensor 4 so that light incident on the light-sensitive area of the image sensor 4 passes through the lens 8 beforehand. The camera 6 also includes a signal electronics system 5, which is used, e.g., for scanning the light-sensitive area of the image sensor 4.

The receiver 12 also includes an attachment element 3. The attachment element 3 is arranged in front of the image sensor 4 such that light incident on the light-sensitive area of the image sensor 4 passes through the attachment element 3 beforehand. The attachment element 3 is formed in the shape of a relatively thin, light-transmitting film. The attachment element 3 is arranged between the light source 1 of the transmitter 14 and the camera 6.

The camera 6 of the receiver 12 is, for example, part of a cell phone or smartphone. The receiver 12 optionally also includes an accommodating unit. The accommodating unit is, for example, a case including a first accommodating element and a second accommodating element. For example, the second accommodating element can be moved, e.g., pivoted, relative to the first accommodating element. The cell phone with the camera 6 is accommodated in the first accommodating element, and the attachment element 3 is accommodated in the second accommodating element. The attachment element 3 is thus movable—for example, pivotable or displaceable—relative to the camera 6. If data transmission via the system 10 is not desired, the attachment element 3 may be removed from the camera 6, and the camera may capture a complete optical image without the attachment element 3.

Figure 2:
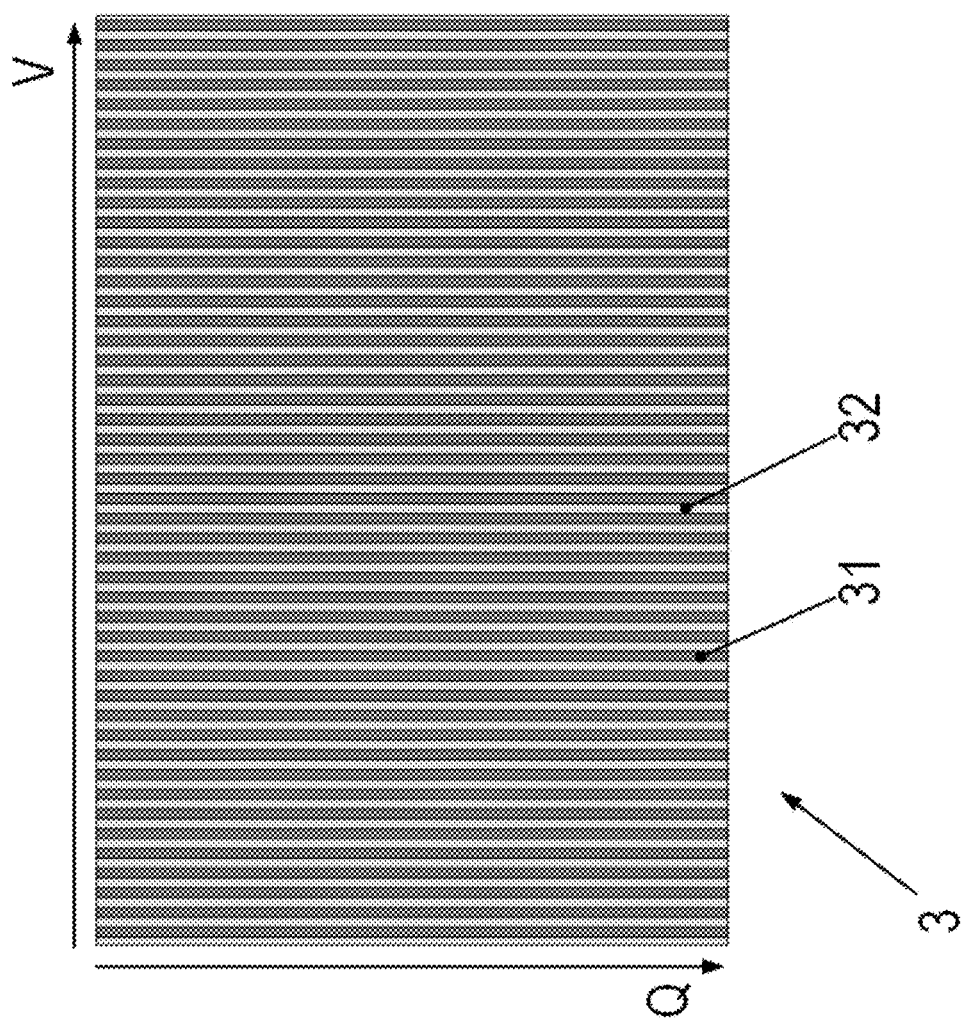
FIG. 2 is a top view of an attachment element.

FIG. 2 shows a top view of an attachment element 3. The attachment element 3 has a plurality of stripe-shaped lenticular regions 31 and a plurality of stripe-shaped planar regions 32. The stripe-shaped lenticular regions 31 and planar portions 32 are oriented parallel to a transverse direction Q, and perpendicular to a preferred direction V.

The lenticular regions 31 of the attachment element 3 are formed such that light passing through the lenticular regions 31 is refracted relatively strongly. For example, a light beam originating from a point light source 1 is imaged in the form of a luminous stripe. Light passing through the lenticular regions 31 of the attachment element 3 generates a first image on the light-sensitive area of the image sensor 4. The first image is blurred due to the relatively strong refraction of the light.

The planar regions 32 of the attachment element 3 are formed such that light passing through the planar regions 32 penetrates the attachment element 3 at least approximately in a straight line, i.e., is not or only insignificantly refracted. Light passing through the planar regions 32 of the attachment element 3 generates a second image on the light-sensitive area of the image sensor 4. The second image is a sharp optical image.

Figure 3:
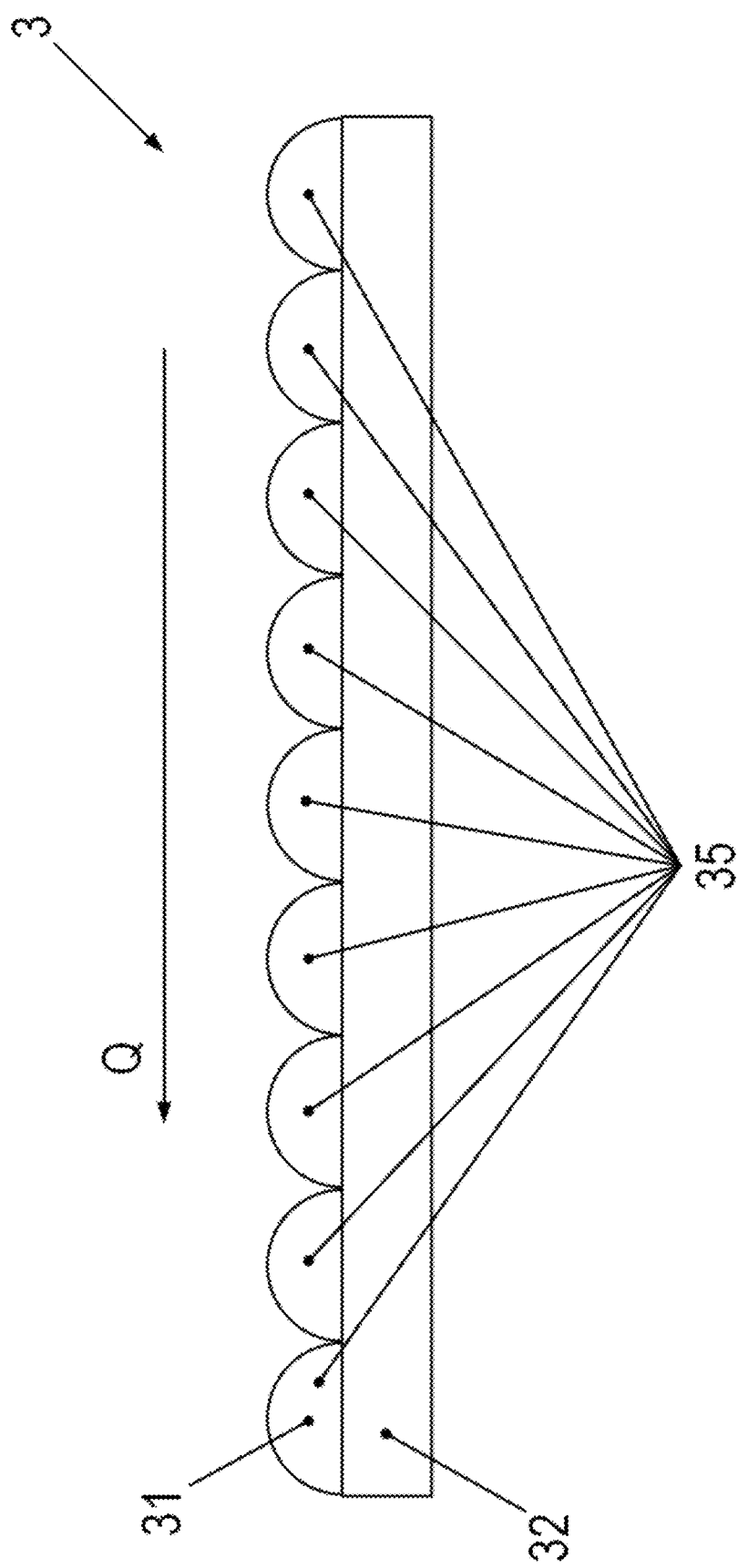
FIG. 3 is a cross-sectional view through the attachment element.

FIG. 3 shows a section through the attachment element 3. The illustrated section extends in the transverse direction Q through one of the stripe-shaped planar regions 32. The illustrated section through the attachment element 3 extends at right angles to the preferred direction V.

The planar region 32 of the attachment element 3 has an at least approximately constant material thickness. Thus, light penetrates the planar region 32 at least approximately in a straight line and is not or only insignificantly refracted.

The lenticular region 31 of the attachment element 3 has an alternating material thickness. The lenticular region 31 has a plurality of bumps 35, which are arranged adjacent to one another in the transverse direction Q. The bumps 35 are semicircular in shape. The bumps 35 can also have other shapes. The material thickness of the lenticular region 31 is thus alternating in the transverse direction Q. The material thickness of the lenticular region 31 is constant in the preferred direction V. Light incident on the lenticular region 31 is thus refracted to different degrees depending on the location of incidence.

Figure 4:
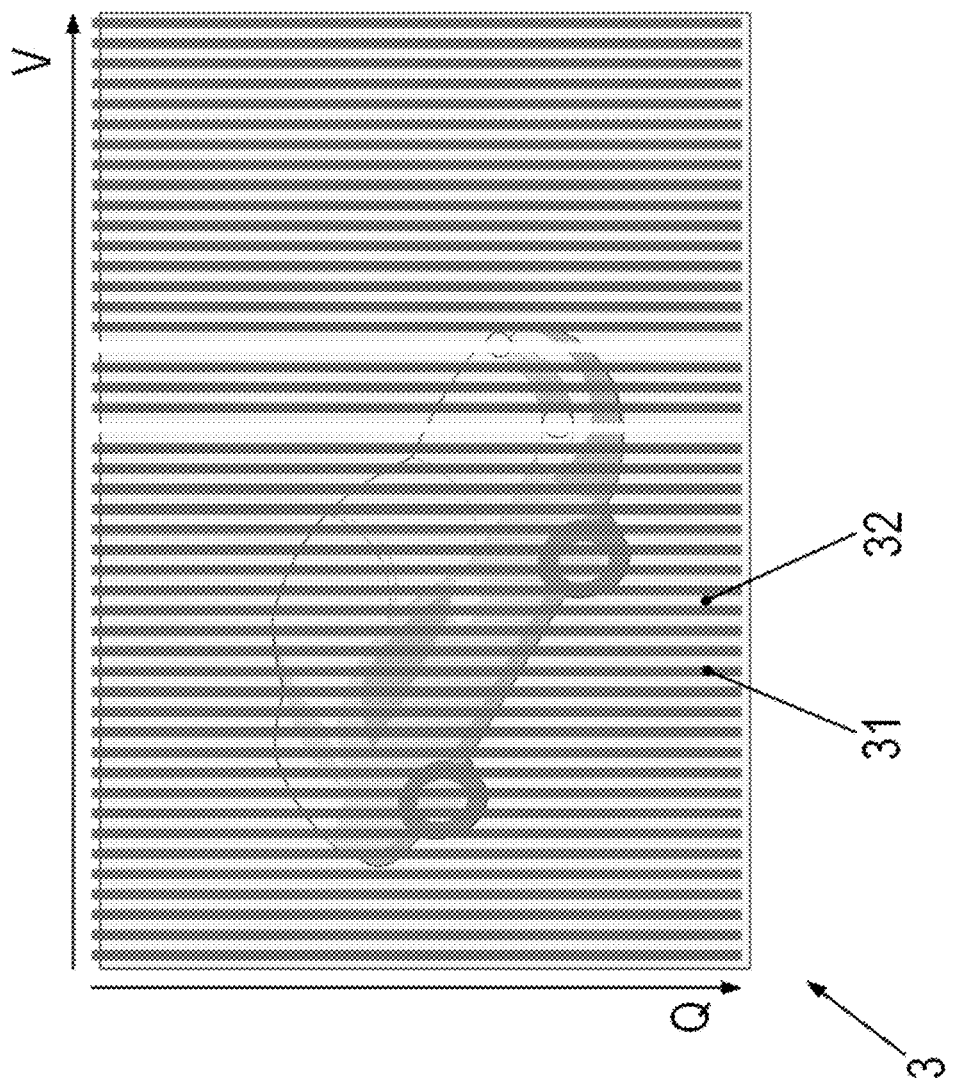
FIG. 4 illustrates an overall image being projected through the attachment element.

FIG. 4 shows an overall image being projected through the attachment element 3. The overall image includes a first image generated by light passing through the lenticular regions 31 of the attachment element 3. The overall image also includes a second image generated by light passing through the planar regions 32 of the attachment element 3. The transmitter 14 generating the overall image is, e.g., a motor vehicle. The motor vehicle has two light sources 1 which are arranged as headlights. The two light sources 1 should be regarded as approximately punctiform.

The light emitted by the light sources 1, which is incident at right angles on a lenticular region 31 of the attachment element 3, is refracted and imaged in the form of a luminous stripe. The luminous stripes generated by the two light sources extend in the direction of the lenticular regions 31, i.e., in the transverse direction Q. Lenticular regions 31, on which no light from the light sources 1 incides at right angles, generate stripes of significantly lower brightness which also extend in the transverse direction Q. Thus, the first image has two luminous stripes and a plurality of dark stripes.

The light emitted by the remaining parts of the transmitter 14, which is incident at right angles on a planar region 32 of the attachment element 3, penetrates the attachment element 3 at least approximately in a straight line. This results in a stripe-shaped second image. The second image is a sharp optical image. The second image shows the transmitter 14 only partially. Nevertheless, the transmitter 14, e.g., e a motor vehicle, is clearly recognizable.

Figure 5:
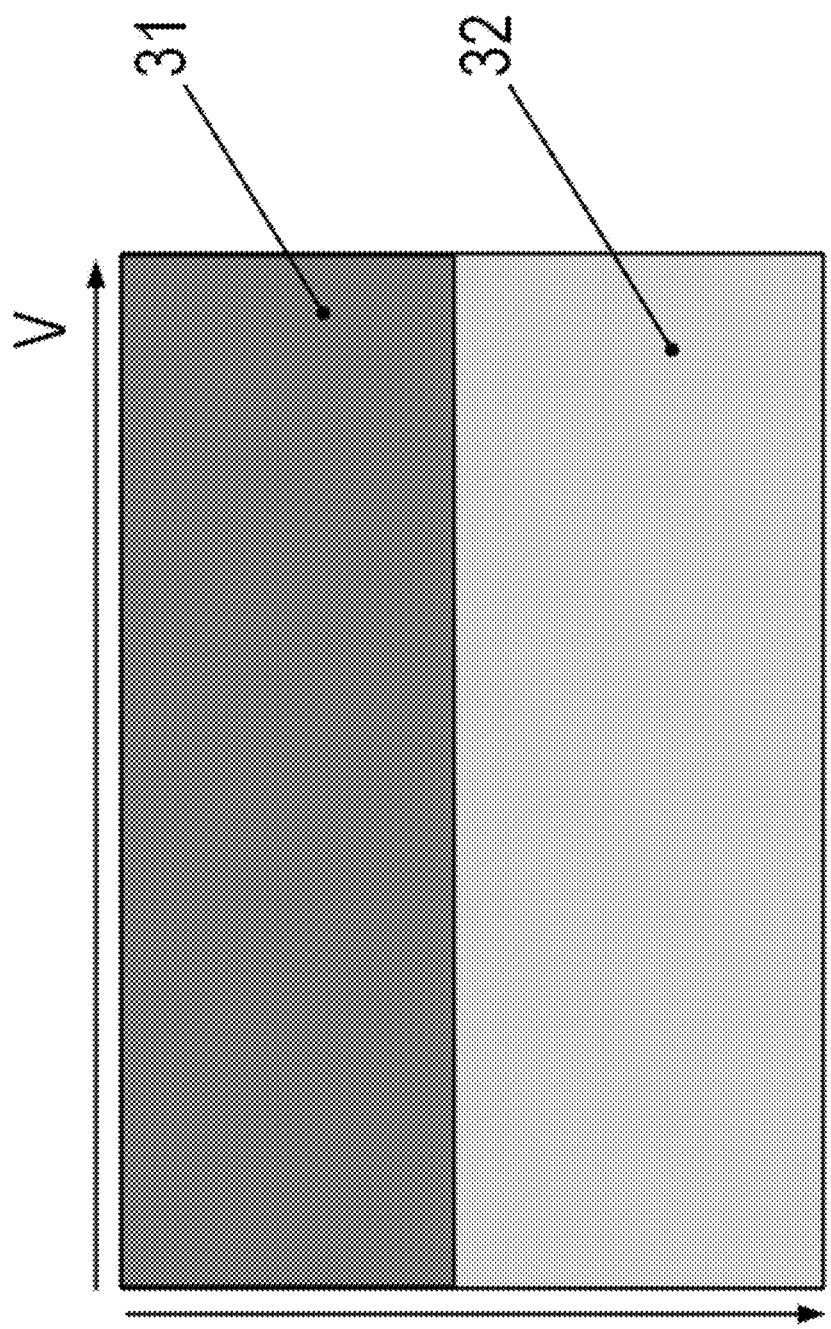
FIG. 5 is a top view of an attachment element.

FIG. 5 is a top view of an attachment element 3. The attachment element 3 has exactly one lenticular region 31 and exactly one planar region 32. The lenticular region 31 and the planar region 32 are each rectangular in shape and have approximately equal surfaces.

LIST OF REFERENCE CHARACTERS 1 light source
3 attachment element
4 image sensor
5 signal electronics system
6 camera
8 lens
10 system
12 receiver
14 transmitter
31 lenticular region
32 planar region
35 bump
Q transverse direction
V preferred direction

The invention claimed is:

1. A receiver for a light transmission system, comprising: a camera including an image sensor, a light-sensitive area of the image sensor including a plurality of rows of light-sensitive elements, the image sensor configured to scan the light-sensitive area of the image sensor row-by-row or column-by-column, and an attachment element arranged such that light incident on the light-sensitive area of the image sensor previously passes through the attachment element, the attachment element including at least one lenticular region and at least one planar region;
wherein the attachment element includes a plurality of alternating stripe-shaped lenticular regions and stripe-shaped planar regions.

2. The receiver according to claim 1, wherein the attachment element is foil- or plate-shaped, the lenticular region has an alternating material thickness, and the planar region has a constant material thickness.

3. The receiver according to claim 1, wherein a material thickness of the lenticular region is constant in a preferred direction and is alternating in a transverse direction perpendicular to the preferred direction.

4. The receiver according to claim 1, wherein the attachment element includes a plurality of stripe-shaped lenticular regions and a plurality of stripe-shaped planar regions.

5. The receiver according to claim 4, wherein the stripe-shaped lenticular regions are oriented parallel to a transverse direction.

6. The receiver according to claim 1, further comprising an accommodating unit, including a first accommodating element and a second accommodating element movable relative to the first accommodating element, the camera being accommodated in the first accommodating element, and the attachment element being accommodated in the second accommodating element.

7. The receiver according to claim 1, wherein the lenticular region includes a plurality of bumps arranged side by side in a transverse direction.

8. The receiver according to claim 7, wherein the bumps are semicircular-shaped.

9. The receiver according to claim 1, wherein the lenticular region and the planar region are arranged adjacent to each other on a same side of the attachment element.

10. The receiver according to claim 1, wherein light that passes through the planar region is not diffracted by the attachment element.

11. A light transmission system, comprising:
a receiver as recited in claim 1; and
a transmitter including at least one controllable light source adapted to emit modulated light in accordance with a predetermined data stream.

12. The system according to claim 11, wherein the attachment element is arranged between the controllable light source and the camera.

13. A method of operating a light transmission system that includes a receiver and a transmitter, the receiver including a camera including an image sensor, a light-sensitive area of the image sensor including a plurality of rows of light-sensitive elements, the image sensor configured to scan the light-sensitive area of the image sensor row-by-row or column-by-column, and an attachment element arranged such that light incident on the light-sensitive area of the image sensor previously passes through the attachment element, the attachment element including at least one lenticular region and at least one planar region, the transmitter including at least one controllable light source adapted to emit modulated light in accordance with a predetermined data stream, comprising:

scanning the light-sensitive area of the image sensor row-by-row or column-by-column; and processing a first image projected through the lenticular region of the attachment element onto the light-sensitive area separately from a second image projected through the planar region of the attachment element onto the light-sensitive area.

14. The method according to claim 13, wherein the data stream is detected from the first image, according to which the controllable light source of the transmitter emits the modulated light.

15. The method according to claim 13, further comprising detecting an optical image from the second image.

16. The method according to claim 13, wherein the attachment element includes a plurality of alternating stripe-shaped lenticular regions and stripe-shaped planar regions.

17. A receiver for a light transmission system, comprising:

a camera including an image sensor, a light-sensitive area of the image sensor including a plurality of rows of light-sensitive elements, the image sensor configured to scan the light-sensitive area of the image sensor row-by-row or column-by-column, and an attachment element arranged such that light incident on the light-sensitive area of the image sensor previously passes through the attachment element, the attachment element including at least one lenticular region and at least one planar region;

wherein the attachment element includes a plurality of alternating stripe-shaped lenticular regions and stripe-shaped planar regions arranged on a same side of the attachment element.

* * * * *